3,361,546
INHIBITING THE GROWTH OF SLUDGE FORMING MICROORGANISMS IN STORAGE FACILITIES
Richard L. Raymond, Wilmington, Del., and John D. Douros, Jr., West Chester, and John J. Melchiore, Wallingford, Pa., assignors to Sun Oil Company, Philadelphia, Pa., a corporation of New Jersey
No Drawing. Filed Jan. 15, 1962, Ser. No. 166,362
The portion of the term of the patent subsequent to Jan. 14, 1981, has been disclaimed
8 Claims. (Cl. 44—70)

This invention describes a method of protecting hydrocarbon distillate compositions stored within a confined zone in the presence of water from microorganism attack.

More particularly this invention concerns the addition of certain di-substituted naphthalene additives to the above hydrocarbon distillates to inhibit the growth of sludge or slime producing microorganisms.

These microorganisms include such classes as the bacteria, actinomycetes, algae, fungi, and yeasts.

These microorganism growth-inhibiting additives are of the structure:

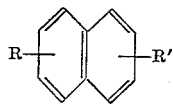

wherein R and R' which may be the same or different are substituents selected from the group consisting of (1) carboxy, (2) the salts of carboxy, and (3) oxides of alkali metals, ammonium, and substituted ammonium.

As used throughout this disclosure, carboxy is understood to be those radicals having at least 1 and no more than 6 carbon atoms, branched or unbranched, joined or conjoined.

The term "oxides" as used throughout this disclosure refers to those compounds which result when the hydrogen atom from a hydroxy substituent is replaced with a metallic ion such as potassium or sodium, or an ammonium ion or a substituted ammonium ion such as ethyl-ammonium and the like.

Examples of compositions intended to be within the scope of the instant invention are the alkali metal oxides, ammonium oxides, and substituted ammonium oxides of 1,2-, 1,3-, 1,4-, 1,5-, 1,6-, 1,7-, 1,8-, 2,3-, 2,6-, and 2,7-dihydroxynaphthalenes and their corresponding hydroxynaphthoic acids and their salts such as 2-hydroxy-1-naphthoic acid, the sodium salt of 6-hydroxy-2-naphthoic acid, the ammonium salt of 8-hydroxy-1-naphthoic acid, dicarboxynaphthalenes such as the 1,2-, 1,3-, 1,4-, 1,5-, 1,6-, 1,7-, 1,8-, 2,3-, 2,6-, and 2,7-dicarboxynaphthalenes and their salts.

While all of the above compositions inhibit the formation of sludge or slime caused by microorganisms, as in any large group of compounds, there are certain considerations such as substantial differences of activity, commercial availability, ease of production, yield, solubility, cost, and the like, which cause some of the compositions to be favored over the others. Thus, within the large group of disclosed compounds, a smaller group of compounds are favored, because they possess a high degree of activity in inhibiting the growth of microorganisms and good water solubility. These favored compounds are the salts of carboxy, and the oxides of alkali metals, ammonium and substituted ammonium.

Surprisingly enough, not all of the position isomers have equal activity. For example, it has been found that the 1,2- and 1,8- are the most active positions. Thus the preferred inhibitors of this invention are the alkali metal salts, the ammonium salts, and the substituted ammonium salts of the 1,8- and 1,2-dicarboxynaphthalenes, and the alkali metal oxides, ammonium oxides, and substituted ammonium oxides of the 1,8- and 1,2-dihydroxynaphthalenes.

Examples of these substituted ammonium salts which may be used are the mono-, di-, tri- and tetraalkyl ammonium such as methylammonium, ethylammonium, amylammonium, decylammonium, stearylammonium, dimethyl-, diethyl-, dipropyl-, dibutyl-, diamyl-, dioctyl-, didecyl-, distearylammonium, trimethyl-, triethyl-, tripropyl-, tributyl-, triamyl-, trioctyl-, trilaurylammonium, mono-, di-, and trialkanolammonium, including mono-, di-, and triethanolammonium, propanolammonium, butanolammonium, tetraalkylammonium, including tetramethylammonium, trimethyl-(2-chloroethyl) ammonium, trimethyl-(2-hydroxylethyl) ammonium, also anilinium, N-methylanilinium, N,N-dimethylanilinium, pyridinium, N-laurylpyridinium, N-cetylpyridinium, morpholinium, N-methylmorpholinium, piperazinium, benzylammonium, cyclohexylammonium, hydrazinium, hydroxylammonium, and the like.

Since the activity of these inhibitors is contributed by the di-substituted naphthalene moiety, the nature of the salt used is immaterial except from the standpoint of convenience. The main purposes of the salts are to facilitate handling and to impart at least slight water solubility to the molecule. For these reasons all of the above salts are considered to be equivalent for inhibitory purposes.

By "hydrocarbon distillates" is meant those cuts of petroleum distillates comprising mostly saturated aliphatic and cyclic hydrocarbons with little or no aromatic content. These distillates include straight run gasolines and heating oil among others. Particularly of interest are the kerosene type aviation fuels known as "jet fuels" or more properly referred to as turbine engine fuels. By "heating oils" and gasoline is meant those cuts of hydrocarbon distillates used for heating purposes or as fuels for an internal combustion machine in automobiles or aeroplanes.

The term "microorganisms" as used throughout this disclosure refers to those organisms of biological origin, of microscopic or ultra microscopic size, capable of metabolizing or feeding upon jet fuel substrates in the presence or absence of oxygen. These microorganisms include but are not limited to bacteria, fungi, yeasts, molds, algae, protozoa, and the like. Microorganisms particularly troublesome in jet fuels include among many others the following genera: Penicillium, Aspergillus, Spicaria, Helminthosporium, Pseudomonas, Aerobacter, Bacterium, Clostridium, Cladsporium, as well as certain gram-negative Diplococcus and Spirochaetes.

That certain types of microorganisms can feed upon, attack, or metabolize hydrocarbons has been known for many years, but has aroused little but academic interest.

The reason for this lack of interest was that little hydrocarbon was consumed. Furthermore, the microorganism attack took place over long periods of time and no perceptible change in the hydrocarbon substrate was apparent to the consumer.

Recently, however, with the much wider use of turbine type aircraft, large quantities of kerosene type fuels free from even trace contaminants are required. This widespread use of kerosene type fuels has made it commonplace to store large quantities under conditions especially conducive to the growth of microorganisms. These conducive growth conditions of water, oxygen and warm temperatures are commonly found in large permanent storage facilities. Furthermore, particularly in warmer climates, the conditions of storage not only support the presence of microorganisms but accelerate their rate of growth considerably.

The small amounts of hydrocarbon fuel consumed by the microorganism is but an insignificant part of the problem. The real problem is one of corrosion caused by the presence of small quantities of sludge, slime or sediment formed by microorganisms. Apparently, this material is exuded by the microorganisms as they digest the hydrocarbon substrate. While the mechanism of the formation of this metabolic waste product is not well understood at this time, the presence of the sludge-like material clearly accelerates the rate of corrosion of metallic parts coming into contact with the contaminated fuel. Thus, storage tanks used to store the hydrocarbon distillate fuels require more frequent repair or replacement. More important, if this sludge is not prevented from forming, or removed after its formation, it can cause serious problems during operational use in the turbine engine. For example, there have been reports of the sludge fouling the aeroplane's fuel filters, coalescers, and tank gauges to the point that they become unreliable. These malfunctions of aircraft parts interfere with efficient engine operation, and it is suspected, has upon occasion caused operational turbine-engine failure.

With the recognition of the existence of the sludge problem many different solutions have been suggested and tried. These include more extensive purification and dehydration of the fuel, coating the storage tank sides with protective materials, adding rust and bactericidal or fungicidal inhibitors to the stored fuel compositions as fuel additives, and better "housekeeping." The latter involves more frequent cleaning of the tanks and draining off the accumulated water. Unfortunately, all of these approaches appreciably raise the cost of the fuel and none has proved to be truly effective. Turbine engine fuel is already remarkably free from water and solid contaminants. For example, most commercial specifications call for less than 2 mg. of solid particles per gallon and less than 100 p.p.m. of water. To reduce these trace impurities further or to dehydrate the fuel more completely would be prohibitively expensive and would require much more effective storage facilities than presently exist. The use of bacteriostatic or fungistatic additives such as organic boron compounds is promising, but up to now, none of the recommended compounds is completely satisfactory in so far as activity or cost is concerned. For example, a recent report on the problem by Gulf Research and Development Company (Development of the Microbiological Sludge Inhibitors) by Churchill and Leathen reveals that all of the recommended materials required concentrations of at least 500 p.p.m. to function effectively, the majority requiring 1000-20,000 p.p.m. Furthermore, the cost of some of these inhibitors substantially increases the cost of the fuel. Another failing of many of these compositions is their exceedingly narrow spectrum of inhibitory activity against microorganisms. Few if any of the recommended biocides would be effective against many of the 184 microorganisms disclosed (in the above report) to have been isolated from contaminated fuel samples. Thus, applicants' discovery that the above-mentioned di-substituted naphthalene derivatives in small concentrations inhibit the growth of the noxious microorganisms is a truly significant finding, advantageous in several respects. For example, applicants' microorganism growth inhibitors have a broad spectrum of activity against a variety of sludge-forming yeasts, fungi, and bacteria, including but not limited to the following genera: Aspergillus, Alternaria, Rhizopus, Fusarium, Proteus, Pseudomonas, Salmonella, Staphylococcus, Escherichia, Bacillus, Kloeckera, Saccharomyces.

This broad spectrum of activity against microorganisms is unusual in that many of the suggested biocides are highly active against a few microorganisms but are completely inactive against all others. For example, these inhibitors are advantageous over the biocidal organic boron rates in having a broad spectrum of inhibitory activity against many different types of microorganisms, and high activity at low concentrations. This results in effective low cost treatment per gallon of fuel.

An additional advantage of the inventive compositions is that they or their salts possess good water solubility coupled with high inhibitory activity. This water solubility is especially important in inhibiting or controlling the growth of microorganisms growing in water associated with hydrocarbon distillates stored in large permanent storage facilities. This water is present in the form of entrained water or in a water phase which results from the heavier dispersed or entrained water settling out to the storage tank bottom. For these purposes, a microorganism inhibitor which possesses at least slight solubility in water is needed so that the inhibiting chemical can enter the environment of the microorganisms and remain in contact with them sufficiently long to inhibit their growth.

To more fully set forth the detailed workings and advantages of this invention, the following illustrative examples of this invention are submitted:

*Example I.—Determining fungicidal activity of representative compounds of this invention against test organisms*

Experimental

The following viable test fungi are treated as described below:

Fusarium oxysporum
Fusarium roseum
Rhizopus nigricans
Rhizopus stolonifer
Aspergillus niger
Alternaria solani One loopful of the above viable fungi cultures, spores and mycelia are transferred from agar slants to 80 ml. portions of the nutrient broth given below:

| Component: | Percentage by wt. |
|---|---|
| Bacto-soytone | 1.0 |
| Bacto-dextrose | 4.0 |
| Deionized water to volume. | |

The 80 ml. portion of the fungi and broth are placed on a sterile trypsinizing flask (300 ml.) and placed on a rotary shaker for 72 hours at room temperatures. At the end of this incubation time period, 20 ml. of the liquid is homogenized and placed into another sterile trypsinizing flask (300 ml.) containing 90 ml. of the above nutrient broth and 500 p.p.m. and 1000 p.p.m. respectively of the chemical being evaluated. The flasks are placed on a rotary shaker operating at 240 r.p.m. at room temperature for three days. After this second incubation time the flasks are taken off and examined for visible fungal growth. Untreated controls are used as the basis of comparison.

*Results.*—The following chemicals gave substantially complete inhibition of fungal growth at 500 p.p.m. to 1000 p.p.m.:

Diammonium salt of 2,6-dicarboxynaphthalene
Disodium salt of 2,7-dicarboxynaphthalene
Didimethylamine salt of 1,6-dicarboxynaphthalene
Dipotassium salt of 1,8-dicarboxynaphthalene
Disodium salt of 1,2-dicarboxynaphthalene

*Example II.—Evaluation of compositions as inhibitors of sludge formation in jet fuels*

Standards Preparation.—A 100 ml. portion of fuel designated by the A.S.T.M. as J.P.-4 fuel is layered over 10 ml. of mineral salt medium in 250 ml. "Boston Round Bottles." Sufficient test compound is added (none is added for the control) to give concentrations of 500 and 1000 p.p.m. in the water phase.

*Experimental.*—Each of the above test standards (500 and 1000 p.p.m.) containing test chemical to be evaluated is inoculated with a sludge containing viable microorganism such as bacteria, molds, and actinomycetes. The sludge-test chemical systems are incubated at room temperature (25° C.) for 2 weeks, then inspected for growth. The results appear in the table which follows the "key" of evaluating control.

*Key*

++++—luxuriant growth, no control
+++—substantial growth, no effective control
++—moderate growth, a little control
+—little growth, fairly good control
None—no growth, complete control

TABLE I

| Chemical Tested | Concentration in p.p.m. and Control Obtained ||
|---|---|---|
| | 500 p.p.m. | 1,000 p.p.m. |
| Sodium salt of 6-hydroxy-2-naphthoic acid | + | None. |
| Propanolammonium salt of 6-methyl-2-naphthoic acid. | ++ | Do. |
| Dimethylamine salt of 2-hydroxy-6-naphthoic acid. | ++ | + |
| Disodium salt of 1,5-dicarboxynaphthalene | +++ | + |
| Ammonium salt of 8-hydroxy-2-naphthoic acid | + | None. |
| Pyridinium salt of 1-hydroxy-2-naphthoic acid | ++ | + |
| Tetraethylammonium salt of 1-hydroxy-2-naphthoic acid. | + | None. |

We claim:
1. A distillate fuel composition comprising a major proportion of a hydrocarbon distillate fuel in contact with an aqueous phase tending to deposit sludges and slime due to the presence of microorganisms, and a microorganism growth-inhibiting amount of a disubstituted naphthalene of the structure:

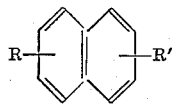

wherein R and R' are substituents selected from the group consisting of (1) carboxy, (2) the alkali metal salts, ammonium salts, and substituted ammonium salts of carboxy, and (3) oxides of alkali metals, ammonium and substituted ammonium, said carboxy substituent having from 1 to 6 carbon atoms.

2. The composition of claim 1 wherein the disubstituted naphthalene is 1,6-dicarboxynaphthalene.

3. The composition of claim 1 wherein the disubstituted naphthalene is the disodium salt of 1,8-dicarboxynaphthalene.

4. The composition of claim 1 wherein the disubstituted naphthalene is 1,2-dicarboxynaphthalene.

5. A method of protecting petroleum distillate fuel storage facilities having microorganism contaminated water therein from sludge and corrosion due to microbial growth therein which comprises contacting the surfaces of said storage facilities with a petroleum distillate fuel composition comprised of a major portion of a hydrocarbon petroleum distillate fuel and a minor amount of a disubstituted naphthalene of the structure

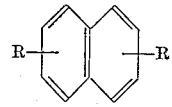

wherein R and R' are substituents selected from the group consisting of (1) carboxy, (2) the alkali metal salts, ammonium salts, and substituted ammonium salts of carboxy, and (3) oxides of alkali metals, ammonium and substituted ammonium, said carboxy substituent having from 1 to 6 carbon atoms, and said disubstituted naphthalene being in an amount sufficient to inhibit growth of microorganisms therein.

6. The method of claim 5 wherein the disubstituted naphthalene is 1,6-dicarboxynaphthalene.

7. The method of claim 5 wherein the disubstituted naphthalene is the disodium salt of 1,8-dicarboxynaphthalene.

8. The method of claim 5 wherein the disubstituted naphthalene is 1,2-dicarboxynaphthalene.

References Cited

UNITED STATES PATENTS

| 1,962,435 | 6/1934 | Downing et al. | 44—71 |
| 2,680,058 | 6/1954 | Harris et al. | 44—76 X |
| 2,975,042 | 3/1961 | Summers | 44—56 |
| 2,975,043 | 3/1961 | Ambrose | 44—72 |
| 2,197,832 | 4/1940 | Reiff | 44—70 X |
| 3,117,909 | 1/1964 | Douros et al. | 167—32 |
| 3,206,398 | 9/1965 | Marlowe et al. | 252—8.55 |
| 3,223,621 | 12/1965 | Marlowe et al. | 252—85 |

OTHER REFERENCES

Gregory: "Uses and Application of Chemical and Related Materials," June 1939, page 400.

DANIEL E. WYMAN, *Primary Examiner.*

J. R. SEILER, Y. M. HARRIS, *Assistant Examiners.*